(12) United States Patent
Sakakibara

(10) Patent No.: US 6,400,421 B1
(45) Date of Patent: Jun. 4, 2002

(54) CHANNEL PRESET DEVICE

(75) Inventor: Shigeto Sakakibara, Osaka (JP)

(73) Assignee: Funai Electric Co., Ltd., Daito (JP)

( * ) Notice: Subject to any disclaimer, the term of this patent is extended or adjusted under 35 U.S.C. 154(b) by 0 days.

(21) Appl. No.: 09/456,323

(22) Filed: Dec. 8, 1999

(30) Foreign Application Priority Data

Dec. 8, 1998 (JP) .......................... 10-009713

(51) Int. Cl.$^7$ ................................. H04N 5/50
(52) U.S. Cl. ..................... 348/732; 348/731
(58) Field of Search ................ 348/731, 732, 348/733, 558

(56) References Cited

U.S. PATENT DOCUMENTS

| | | | | |
|---|---|---|---|---|
| 4,205,347 A | * | 5/1980 | Minoura et al. | 348/731 |
| 4,727,426 A | * | 2/1988 | Itabashi et al. | 348/725 |
| 6,028,630 A | * | 2/2000 | Fukui et al. | 348/312 |
| 6,249,322 B1 | * | 6/2001 | Sugihara | 348/634 |

FOREIGN PATENT DOCUMENTS

| | | |
|---|---|---|
| JP | 61-111075 | 5/1986 |
| JP | 3-107209 | 5/1991 |
| JP | 7-87415 | 3/1995 |

* cited by examiner

Primary Examiner—John W. Miller
Assistant Examiner—Annan Q Shang
(74) Attorney, Agent, or Firm—Crowell & Moring LLP (57) ABSTRACT

In effecting channel preset, a microcomputer first determines whether or not a broadcasting is on the air on the basis of the presence or absence of a horizontal synchronizing signal obtained through synchronizing separation by a video IC, and if it is thereby determined that the broadcasting is on the air, received broadcasting signal is pulled into a normal tuning point on the basis of an AFC voltage from the video IC, whereupon the corresponding channel is stored if a vertical synchronizing signal from the video IC can be detected at the normal tuning point. Therefore, it is possible to provide a channel preset device which is capable to detecting an on-air channel more reliably and storing the same without adding special circuitry and the like.

9 Claims, 5 Drawing Sheets

CHANNEL PRESET DEVICE

BACKGROUND OF THE INVENTION

The present device relates to a channel preset device.

Conventionally, with this type of channel preset device, in a case where a tuner of a phase-locked loop (PLL) system is adopted, the received frequency of the tuner is sequentially varied with regard to the respective channels on the basis of a predetermined channel plan, and a horizontal synchronizing signal which is separated from an output of the tuner at each channel frequency is first counted to determine whether a broadcasting is on the air. Here, if it is determined that a broadcasting is on the air, a determination is made as to whether or not the broadcasting signal can be pulled into a normal tuning point, and if it is possible, a determination is finally made that the broadcasting is on the air, and that channel is stored as a memory channel. On the other hand, if the horizontal synchronizing signal cannot be detected, or if it is impossible even if the horizontal synchronizing signal has been detected, a determination is made that no broadcasting is on the air, and that channel is stored as a skipped channel.

On the other hand, with a channel preset device disclosed in Japanese Utility Model Publication No. 5-78073A, a vertical synchronizing signal is separated from a tuner output, noise components included in the vertical synchronizing signal are eliminated, and the vertical synchronizing signal with the noise components thus eliminated is counted, thereby determining whether or not a normal tuned state has been obtained.

With the above-described related channel preset devices, the following problems have been encountered.

With the former device, there have been cases where even if no broadcasting is on the air, an erroneous determination can be made that the horizontal synchronizing signal has been detected due to the effect of noise or the like. Further, since the AFC pull-in processing is effected by detecting a point of change in a difference voltage corresponding to an offset of the frequency of an actual image carrier wave from a reference frequency while varying the received frequency of the tuner in finely, there have been cases where a point of change which occurs accidentally is detected, and a determination is erroneously made that a broadcasting is on the air.

On the other hand, with the latter device, since circuitry and the like for eliminating the noise components which are included in the separated vertical synchronizing signal are required, the cost has tended to become high.

SUMMARY OF THE INVENTION

The present device has been made in view of the above-described problems, and its object is to provide a channel preset device which is capable of detecting an on-air channel more reliably and storing the same without adding special circuitry and the like.

In order to achieve the above object, there is provided a channel preset device comprising:

tuner means for receiving a television broadcasting signal corresponding to a desired frequency and subjecting the television broadcasting signal to predetermined signal processing and outputting the same;

sync separation means for separating horizontal and vertical synchronizing signals from the output signal of the tuner means and outputting the same;

on-air judgement means for judging whether a broadcasting is on the air on the basis of the presence or absence of the horizontal synchronizing signal in the output signal of the sync separation means while continuously varying a received frequency of the tuner means;

tuning-point detection means for detecting a normal tuning point while varying the received frequency of the tuner means at neighboring frequencies of the frequency at which the on-air judgement means judged that the broadcasting is on the air; and channel memory means for storing a channel corresponding to the normal tuning point when it is detected that the vertical synchronizing signal is outputted from the sync separation means at the normal tuning point detected by the tuning-point detection means.

In the device, at the time the channel memory means stores an on-air channel, the on-air judgement means continuously varies the received frequency of the tuner means. Then, the tuner means subjects the television broadcasting signal to predetermined signal processing at each received frequency and outputs the same, and the sync separation means separates horizontal and vertical synchronizing signals from an output from the tuner means and outputs the same. The on-air judgement means determines an on-air channel on the basis of the presence or absence of the horizontal synchronizing signal in the output signal of the sync separation means. Here, if the on-air judgement means detects the on-air channel, the tuning-point detection means detects a normal tuning point on the basis of the output signal of the tuner means while finely varying the received frequency of the tuner means. The channel memory means then stores a corresponding channel if it is detected that the vertical synchronizing signal in the output signal of the sync separation means at the normal tuning point.

Namely, after an on-air channel is first detected on the basis of the presence or absence of the horizontal synchronizing signal, the broadcasting signal is pulled into the normal tuning point. Then, a determination is made again as to whether or not the broadcasting is on the air on the basis of the presence or absence of the vertical synchronizing signal at that normal tuning point. If it can be determined here that a station is present, the channel is finally stored as the on-air channel. As described above, with the related technique, there have been cases where although no broadcasting is on the air, the tuning point is erroneously detected and a corresponding channel is stored due to the effect of noise or the like. In contrast, in accordance with the present invention, a determination is made as to whether or not a broadcasting is on the air on the basis of the presence or absence of the vertical synchronizing signal after detection of the normal tuning point, so that the on-air channel can be detected more reliably.

Therefore, it is possible to provide a channel preset device which is capable to detecting an on-air channel more reliably and storing the same without adding special circuitry and the like.

As the station selection system of the tuner means, it is possible to adopt various systems if they are capable of continuously varying the received frequency. For example, in a case where a voltage synthesizer system is adopted, it suffices if the tuning voltage is supplied to the tuner in such a manner as to cause the received frequency of the tuner to be varied continuously in predetermined frequency units in a television broadcast band. It goes without saying that, in such a case, the channel which is stored by the channel memory means is data such as tuning voltage value concerning an on-air channel.

Alternatively, there may be configured that: the tuner means includes a frequency synthesizer system for directly controlling a local oscillation frequency of the tuning means in order to tune the system to the desired frequency in accordance with a predetermined channel plan.

In the device, the on-air judgement means detects an on-air channel while continuously varying the received frequency of the tuner means, which has a station selection mechanism of the frequency synthesizer system, in the channel unit on the basis of a predetermined channel plan. Namely, in the frequency synthesizer system, it is possible to tune the system to a desired frequency by directly controlling the local oscillation frequency of the tuner or the like, and the broadcasting signal is received in each channel unit on the basis of a channel plan according to a broadcasting form such as normal television broadcasting or cable television broadcasting.

Accordingly, it is possible to provide a specific configuration in the case where the tuner adopts the frequency synthesizer system.

The tuning-point detection means suffices if it is capable of detecting the normal tuning point while varying the received frequency of the tuner means in vary small units, and its specific configuration is not particularly limited.

For example, there may be configured that; the output signal of the tuner means includes information concerning a difference voltage in accordance with an offset between the received frequency and an image carrier wave frequency; and the tuning-point detection means detects the normal tuning point based on the difference voltage.

In the device, the tuning-point detection means detects the normal tuning point by finely varying the received frequency of the tuner means while monitoring the difference voltage corresponding to an offset between the received frequency and the frequency of the image carrier wave based on the output from the tuner means. That is, the normal tuning point can be detected by utilizing the well-known AFC technique or the like.

The significance of detecting the presence or absence of the vertical synchronizing signal by the channel memory means at the normal tuning point detected by the tuning-point detection means lies in reducing the possibility of erroneously detecting an on-air channel, as described above. Here, it goes without saying that a determination may be made again as to whether or not a station is present by making use of the criterion of the presence or absence of the vertical synchronizing signal, and it does not necessarily mean that a determination is made again as to whether or not a station is present solely on the basis of the presence or absence of the vertical synchronizing signal.

For example, there may be configured that: the channel memory means executes:

first detection processing for detecting the horizontal synchronizing signal at the normal tuning point;

second detection processing for detecting the horizontal synchronizing signal at the normal tuning point, conducted after the lapse of a predetermined time period; and third detection processing for detecting the vertical synchronizing signal at the normal tuning point, conducted within the predetermined time period.

In the device, when the turning-point detection means detects the normal tuning point, the channel memory means effects first detection processing for detecting the horizontal synchronizing signal from the sync separation means at that normal tuning point. Subsequently, the channel memory means similarly effects second detection processing for detecting the horizontal synchronizing signal after the lapse of a predetermined waiting time, and effects third detection processing for detecting the vertical synchronizing signal from the sync separation means during the waiting time. The channel memory means stores the channel for the normal tuning point if the synchronizing signal can be detected in each of the synchronous detection processing.

Accordingly, since the on-air channel is determined at the channel only when the synchronizing signal can be detected in each item of the detection processing. Therefore, it is possible to detect the on-air channel more reliably and store the same.

DETAILED DESCRIPTION OF THE PREFERRED EMBODIMENTS

Hereafter, a description will be given of a channel preset device according to an embodiment of the present invention with reference to the accompanying drawings.

Figure 1:
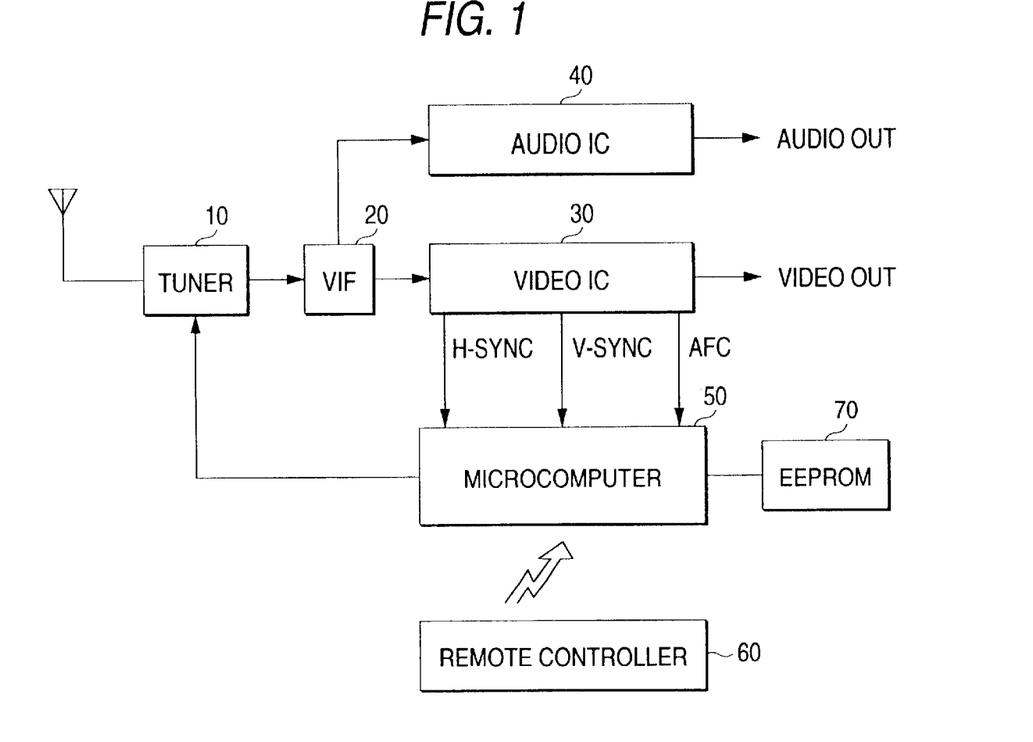
FIG. 1 is a schematic block diagram of a channel preset device in accordance with an embodiment of the present device.

FIG. 1 is a schematic block diagram of the channel preset device.

In the drawing, a tuner 10 is capable of receiving television broadcasting signals at desired frequencies through a receiving antenna, and selects only a required signal from the received signals, effects high-frequency amplification, converts it to an intermediate frequency signal, and outputs the same. The tuner 10 in this embodiment adopts the so-called PLL system, and the received frequency can be controlled by directly controlling the local oscillation frequency on the basis of the input of predetermined frequency data. It should be noted that this embodiment is premised on the assumption that the present device is applied to television broadcasting, but is, of course, applicable to other forms of broadcasting such as cable broadcasting, and the application may be altered, as required.

The intermediate frequency signal outputted from the tuner 10 is subjected to video intermediate frequency amplification by a video intermediate frequency (VIF) circuit 20 and is outputted to a video IC 30. Meanwhile, an audio intermediate frequency signal is present as a frequency-modulated signal which is 4.5 MHz lower than 58.75 MHz which is the frequency of the video intermediate frequency signal, and the signal after being subjected to the intermediate frequency amplification, if amplitude detected by an unillustrated diode, is extracted as a second audio intermediate frequency signal at 4.5 MHz. The second audio intermediate frequency signal which is extracted here is subjected to FM detection by an audio IC 40, and is then amplified appropriately and is outputted. It goes without saying that, in this embodiment, the tuner 10 and the VIF circuit 20 as a whole constitute tuner means of the present invention.

The video IC 30, after effecting video detection with respect to the inputted signal, subjects its detection output to various signal processing and outputs a video signal, and separates horizontal and vertical synchronizing signals from the detection output and outputs the same. Accordingly, in this embodiment, the video IC 30 constitutes sync separation means of the present invention. Further, this video IC 30 generates an AFC voltage corresponding to the offset of the frequency of an actual image carrier wave from the reference frequency, and supplies the aforementioned horizontal and vertical synchronizing signals and the AFC voltage to a microcomputer 50.

The microcomputer 50 is capable of supplying frequency data to the tuner 10, and the received frequencies of the tuner 10 are controlled by the microcomputer 50. More specifically, if an operation is effected so as to receive a desired channel by using a remote controller 60, a corresponding infrared remote control signal is transmitted. The microcomputer 50 then receives the infrared remote control signal through an unillustrated unit for receiving the remote control signal, and sends frequency data to the tuner 10 so as to receive a corresponding channel.

Since actual television broadcasting signals are not necessarily present at the respective channels, in this embodiment, a so-called channel preset function is provided whereby on-air channels where television broadcasting signals are present are stored in advance, and stations are selected on the basis of the stored contents. In the channel preset according to the present invention, each channel judged as the on-air channel is stored into an electrically-erasable programmable ROM (EEPROM) 70 as a memory channel, and each channel judged as an off-air channel is stored into the same as a skipped channel. Next, a detailed description will be given of this channel preset function.

In effecting the channel preset, a channel preset instruction is issued by such as depressing an unillustrated operation button on the remote controller 60. Then, an infrared remote control signal is similarly transmitted from the remote controller 60, and the microcomputer 50 detects the signal and executes the channel preset processing in accordance with a flowchart such as the one shown in FIG. 2. In the drawing, initial channels are first set in step S110. Namely, initial channels are set on the basis of a channel plan according to a broadcasting form such as normal television broadcasting, CATV-NORMAL, or CATV-HRC.

Figure 2:
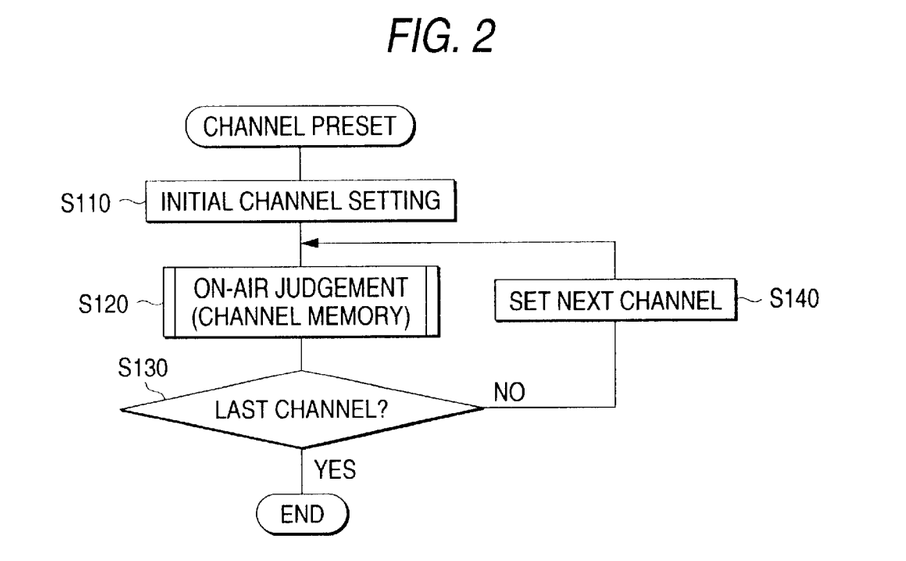
FIG. 2 is a flowchart illustrating a procedure of channel preset processing.

Then, a determination is made as to whether a set channel is an on-air channel or not by executing predetermined on-air judgement processing in step S120, and the fact of the channel being either one of the aforementioned memory channel and the skipped channel is stored in a corresponding channel position of the EEPROM 70 as a result of the determination. Subsequently, in step S130, a determination is made as to whether or not the channel is a last channel, and if it is not the last channel, in step S140, after setting an ensuing channel on the basis of the aforementioned channel plan, similar processing is executed, and upon completion of the processing of the last channel, the channel preset ends.

Figure 3:
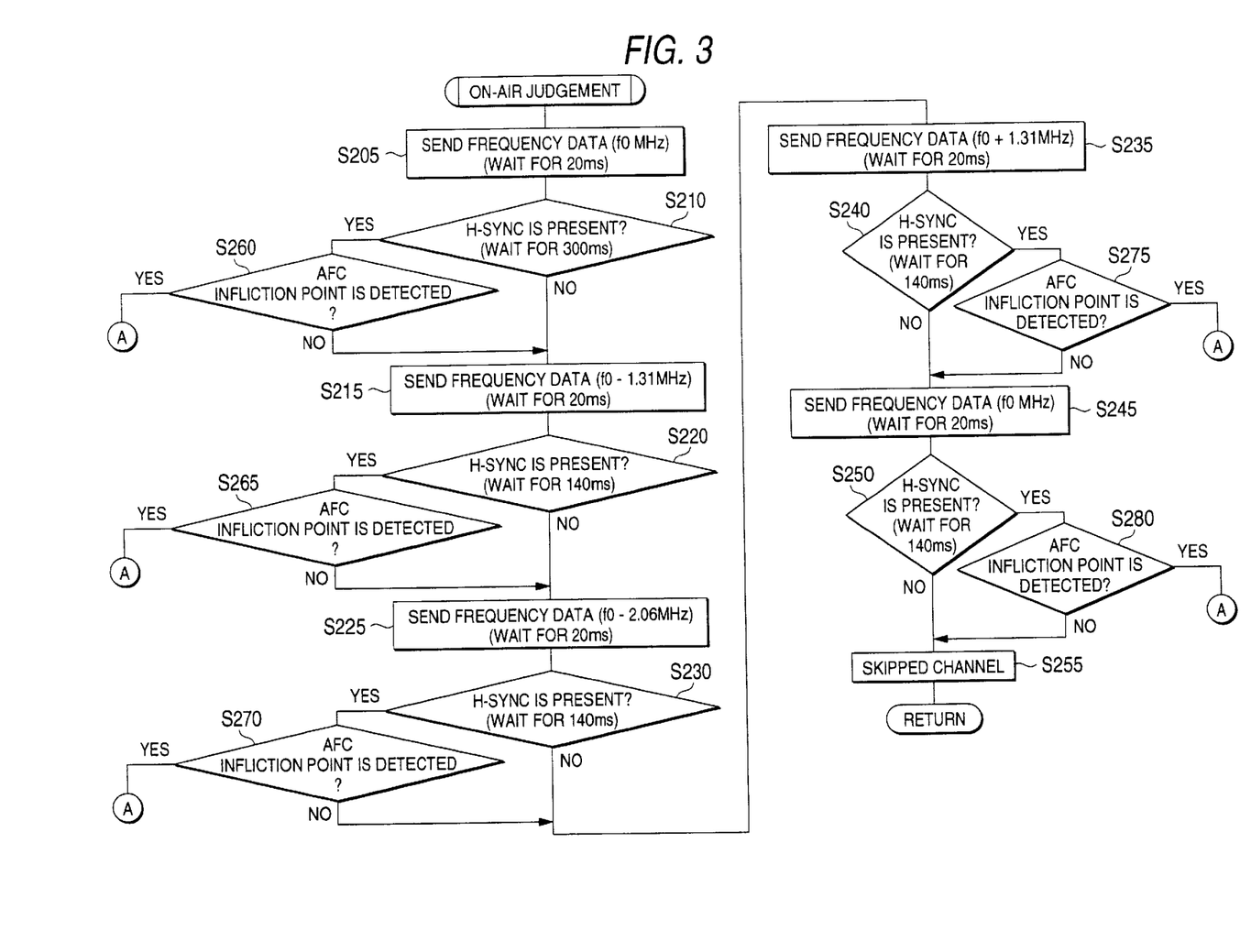
FIG. 3 is a flowchart illustrating the outline of a procedure of on-air judgement processing.
Figure 4:
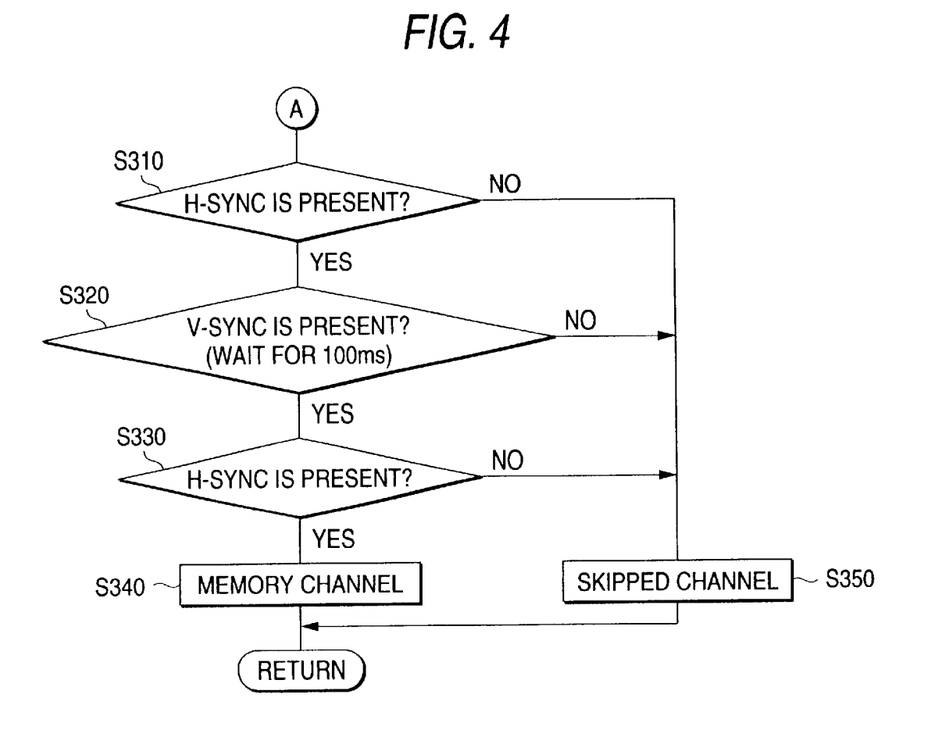
FIG. 4 is a flowchart illustrating the detail of a procedure of the on-air judgement processing.

FIGS. 3 and 4 show the processing procedure of the aforementioned on-air judgement processing through flowcharts. In this on-air judgement processing, first, in step S205, frequency data (center frequency f0) for receiving the channels which are set as described above is sent to the tuner 10. Then, the tuner 10 tunes to the frequency corresponding to the frequency data by directly controlling the local oscillation frequency. Here, if a television broadcasting signal is present at that frequency, the video IC 30 separates horizontal and vertical synchronizing signals from a video detection output based on the output of the tuner 10 and supplies them to the microcomputer 50, and supplies to the microcomputer 50 an AFC voltage corresponding to the offset of the frequency of the image carrier wave from the reference frequency.

It goes without saying that if the television broadcasting signal is absent at the aforementioned frequency, the horizontal synchronizing signal is not supplied to the microcomputer 50. Accordingly, after the lapse of a waiting time of 20 ms, a determination is made in an ensuing step S210 as to whether or not the horizontal synchronizing signal is supplied. Specifically, if the horizontal synchronizing signal can be detected 26 to 36 times during the period of 2 ms, a determination is made that the horizontal synchronizing signal is present. Then, if it cannot be determined that the horizontal synchronizing signal is present until the lapse of 300 ms in total, in step S215, frequency data corresponding to a frequency which is 1.31 MHz lower than the center frequency f0 is sent to the tuner 10. Namely, in a case where the television broadcast signal is present, the television broadcasting signal should naturally be present at the center frequency, but since there is a possibility of the actual broadcast frequency being offset, the received frequency of the tuner 10 is varied.

After the lapse of the waiting time of 20 ms subsequent to the transmission of the frequency data in step S215 above, in an ensuing step S220, a determination is similarly made as to whether or not the horizontal synchronizing signal is present. Then, if it cannot be determined that the horizontal synchronizing signal is present until the lapse of 140 ms in total, in step S225, frequency data corresponding to a frequency which is 2.06 MHz lower than the aforementioned center frequency f0 is sent to the tuner 10. Subsequently, in an ensuing step S230, a determination is similarly made as to whether or not the horizontal synchronizing signal is present, and if it cannot be determined that the horizontal synchronizing signal is present until the lapse of 140 ms in total, in step S235, frequency data corresponding to a frequency which is 1.31 MHz higher than the aforementioned center frequency f0 is sent to the tuner 10.

In this case as well, in an ensuing step S240, a determination is made as to whether or not the horizontal synchronizing signal is present until the lapse of 140 ms in total, and if it cannot be determined that the horizontal synchronizing signal is present, in step S245, the frequency data corresponding to the center frequency f0 is sent again to the tuner 10. Then, in an ensuing step S250, a determination is similarly made as to whether or not the horizontal synchronizing signal is present until the lapse of 140 ms in total, and if it cannot be determined that the horizontal synchronizing signal is present, in step S255, the fact of the channel being a skipped channel is stored in the channel position corresponding to the aforementioned center frequency f0. Of course, in this embodiment, the microcomputer 50 which executes the processing in steps S210, S220, S230, S240, and S250 for each channel frequency constitutes on-air judgement means.

Meanwhile, if it is determined in steps S210, S220, S230, S240, and S250 that the horizontal synchronizing signal is present, predetermined AFC inflection point detection processing is respectively executed in steps S260, S265, S270, S275, and S280 so as to determine whether or not the AFC inflection point can be detected.

Figure 5:
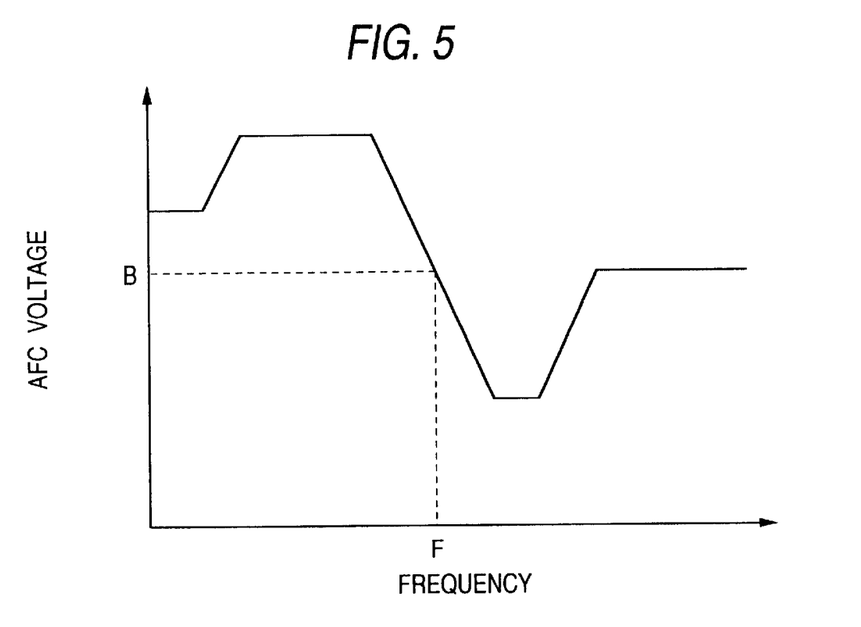
FIG. 5 is a voltage waveform diagram illustrating AFC voltage characteristic.

Here, before giving a description of the aforementioned AFC inflection point detection processing, a description will be given of the voltage characteristic of the AFC voltage. As shown in FIG. 5, this AFC voltage has a voltage characteristic which is inversely S-shaped with the normal tuning point F as the center, and in a case where the frequency of an actual image carrier wave coincides with the reference frequency, the AFC voltage becomes a voltage B, and a monotonously increasing or monotonously decreasing tendency is exhibited in correspondence with the direction of the offset if the two voltages are slightly offset from each other, and the upper side and the lower side of the voltage B become saturated and fixed if the two voltages are greatly offset from each other. Accordingly, if the AFC voltage actually supplied from the video IC 30 and is compared with the voltage B, the direction of the aforementioned offset becomes clear.

Figure 6:
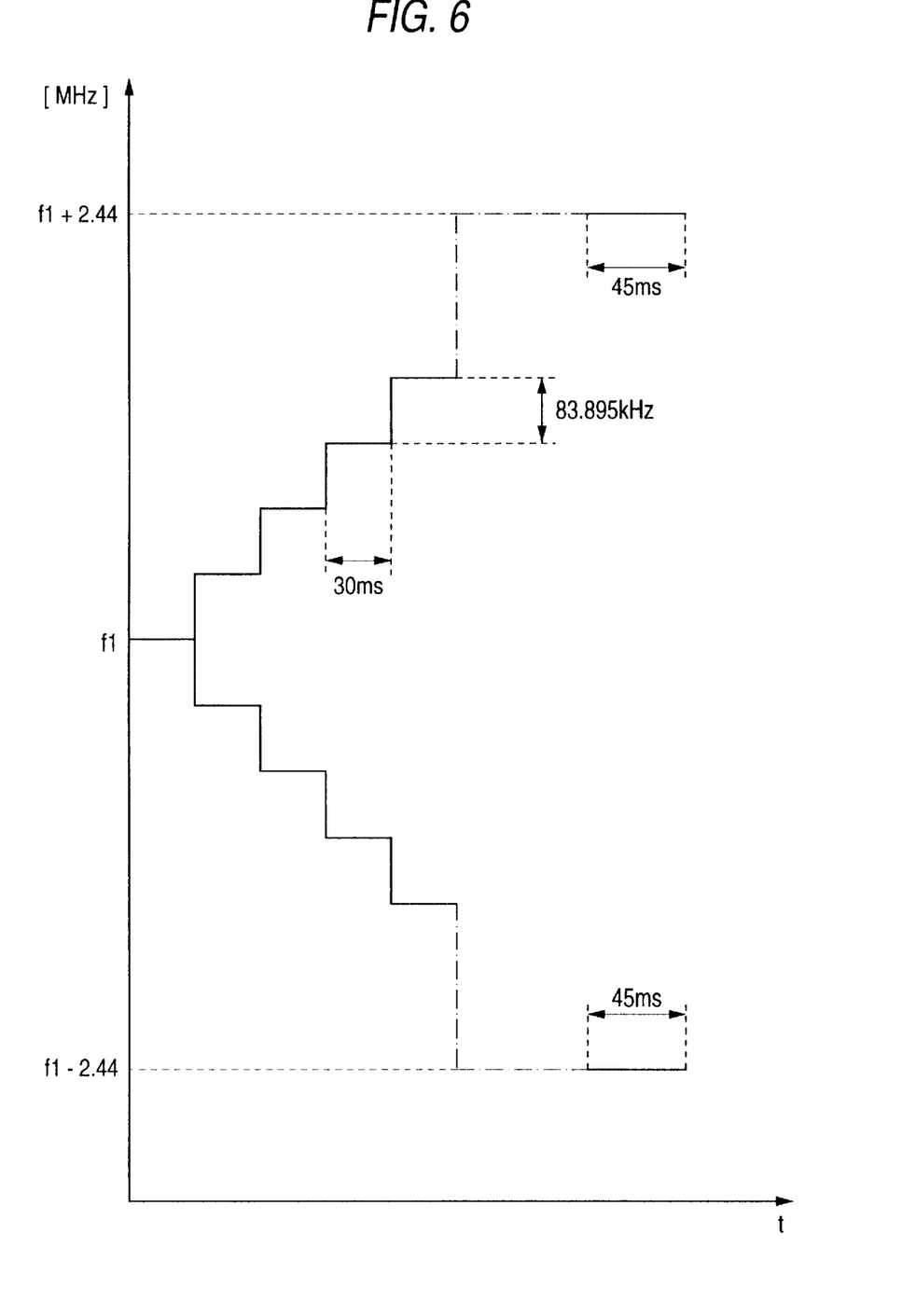
FIG. 6 is a diagram illustrating frequency shifts in primary AFC inflection point detection processing.

The aforementioned AFC inflection point detection processing consists of primary AFC inflection point detection processing and secondary AFC inflection point detection processing. First, in the primary AFC inflection point detection processing, as shown in FIG. 6, the frequency data is sent in such a manner as to consecutively vary the received frequency of the tuner 10 in units of 82.895 kHz/30 ms in correspondence with the direction of the actual offset by setting as a starting point the frequency f1 at which the horizontal synchronizing signal was detected and by setting ±2.44 MHz as an upper limit and a lower limit. Then, if a television broadcasting signal is present, the AFC voltage supplied from the video IC 30 gradually assumes a value close to the voltage B, and after crossing over a value which is closest to the voltage B, the AFC voltage moves away from the voltage B again. Namely, it means that the direction of offset changes after the AFC voltage crosses over the tuning point at this point of time, and this point is referred to as the AFC inflection point. Here, in a case where the AFC inflection point cannot be detected even if the frequency is consecutively varied, and the aforementioned upper limit or lower limit has been reached, a determination is made as to whether or not the AFC voltage does not change again after waiting for 45 ms for the sake of reconfirmation. In this case as well, if the AFC voltage does not change, it is determined that the AFC inflection point is absent.

Figure 7:
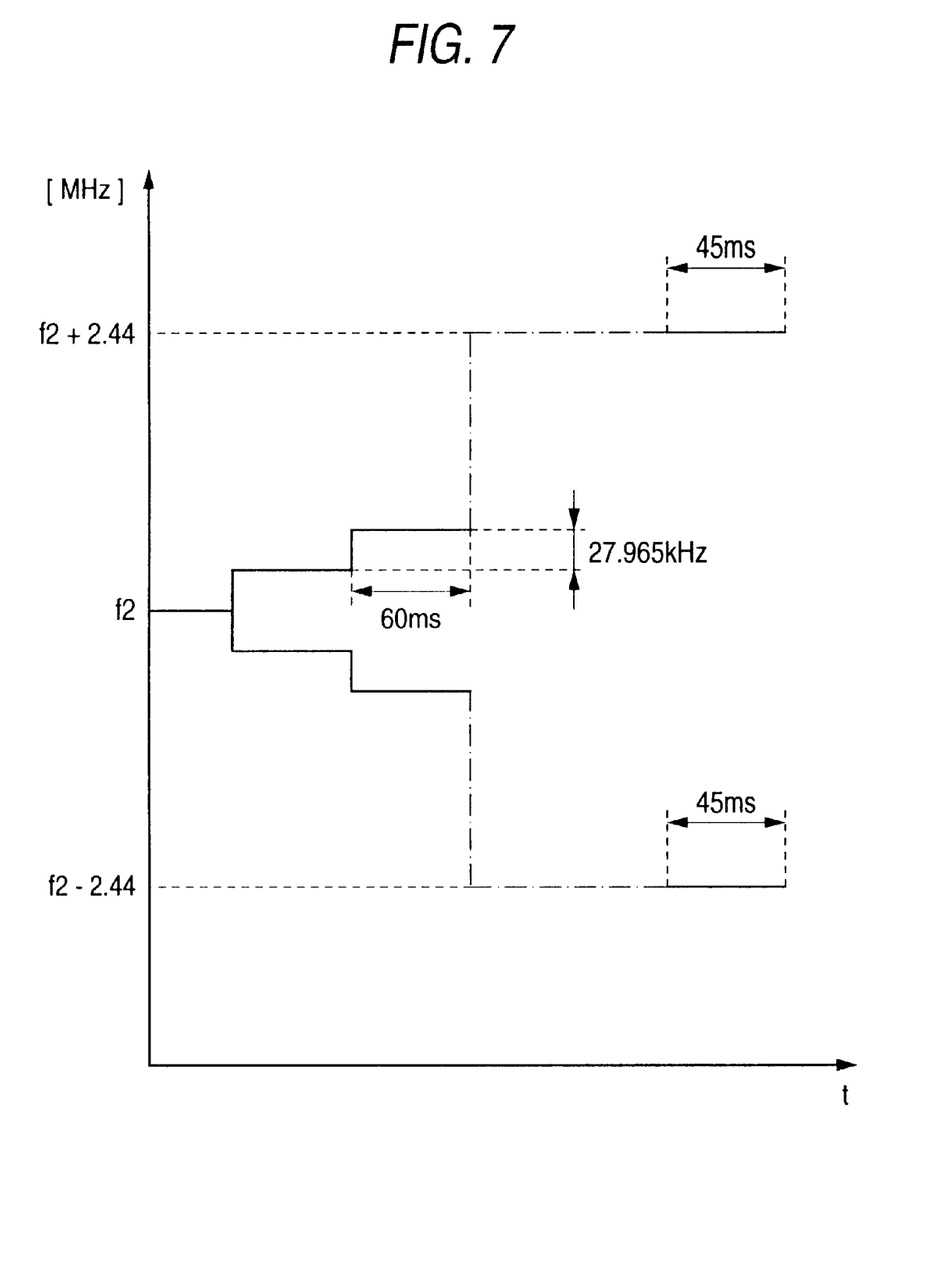
FIG. 7 is a diagram illustrating the frequency shift in secondary AFC inflection point detection processing

On the other hand, if the aforementioned AFC inflection point is detected in the primary AFC inflection point detection processing, the secondary AFC inflection point detection processing is then started. In this secondary AFC inflection point detection processing, as shown in FIG. 7, the frequency data is sent in such a manner as to consecutively vary the received frequency of the tuner 10 in units of 27.965 kHz60 ms in correspondence with the direction of the actual offset by setting as a starting point the frequency f2 at the point of time when the AFC inflection point was detected in the above-described primary AFC inflection point detection processing and by setting ±9.44 MHz as an upper limit and a lower limit. Then, if a television broadcasting signal is present, the AFC inflection point is similarly detected. However, in this secondary AFC inflection point detection processing, since the frequency is varied in smaller steps than in the primary AFC inflection point detection processing, an AFC inflection point which is closer to the normal tuning point is detected. Further, in a case where the AFC inflection point cannot be detected even if the frequency is consecutively varied, and when the aforementioned upper limit or lower limit has been reached, detection is made as to whether or not the AFC voltage does not change again after waiting for a duration of 45 ms in the same way as in the above-described primary AFC inflection point detection processing.

The significance of the primary and secondary AFC inflection point detection processing is as follows.

Namely, whether or not the television broadcasting signal is present in each channel frequency can be essentially determined by the presence or absence of the horizontal synchronizing signal, but due to the effect of noise or the like an erroneous determination can be made that a broadcasting is on the air although a broadcasting is actually off the air. Accordingly, even if the horizontal synchronizing signal is detected, a determination is made as to whether or not the broadcasting signal can be pulled into the normal tuning point by the primary and secondary AFC inflection point detection processing More specifically, the AFC inflection point is roughly detected by the primary AFC inflection point detection processing, and the AFC inflection point is detected more precisely by the secondary AFC inflection point detection processing. Then, if the AFC inflection point cannot be detected by the first or secondary AFC inflection point detection processing, it is assumed that the horizontal synchronizing signal has been erroneously detected due to the effect of noise or the like, and a determination is made that the television broadcasting signal is actually absent. It goes without saying that, in this embodiment, the microcomputer 50 for executing the aforementioned primary and secondary AFC inflection point detection processing constitutes tuning-point detection means of the present invention.

If the AFC inflection point cannot be detected in steps S260, S265, S270, and S275, it is determined that the television broadcasting signal is absent at each frequency, and the operation respectively proceeds to steps S215, S225, S235, and S245 to send ensuing frequency data. Further, in steps S220, S230, S240, and S250, the presence or absence of the horizontal synchronizing signal is determined in a similar manner. On the other hand, if the AFC inflection point cannot be detected in step S280, it is determined that the television broadcasting signal is absent at that channel frequency, and in step S255 the fact of that channel being a skipped channel is stored in a corresponding channel position.

On the other hand, if the AFC inflection point can be detected in steps S260, S265, S270, and S275, in step S310, the presence or absence of the horizontal synchronizing signal from the video IC 30 is determined at the received frequency corresponding to that AFC inflection point. Here, if it is determined that the horizontal synchronizing signal is present, the presence or absence of the vertical synchronizing signal from the video IC 30 is determined in step S320. More specifically, if the vertical synchronizing signal can be detected at least once until the lapse of 100 ms in total, it is determined that the vertical synchronizing signal is present. Then, if it is determined that the vertical synchronizing signal is present, in step S330, the presence or absence of the horizontal synchronizing signal is determined again after the lapse of 100 ms in total, and if it is determined here that the horizontal synchronizing signal is present, in step S340, the fact of the channel being a memory channel is stored in the corresponding channel position. On the other hand, if it is determined in any of steps S310, S320, and S330 that the synchronizing signal is absent, in step S350, the fact of the channel being a skipped channel is stored in the corresponding channel.

As described above, in this embodiment, after the normal tuning point is detected by the AFC inflection point detection processing, the presence or absence of the horizontal synchronizing signal is detected at that normal tuning point, the presence or absence of the horizontal synchronizing signal is detected again after the lapse of a predetermined waiting time, the presence or absence of the vertical synchronizing signal is detected during the waiting time, and if the synchronizing signal can be detected in each detection processing, the fact of the channel being a memory channel is stored. The microcomputer 50 and the EEPROM 70 in executing these items of processing constitutes channel memory means of the present invention. In addition, it goes without saying that, by adopting the above-described configuration, it becomes possible to detect more reliably only on-air channels and store them.

Next, a description will be given of the operation during channel preset in accordance with the embodiment configured as described above.

If a channel preset instruction is issued by such as depressing an unillustrated operation button on the remote controller 60, a predetermined infrared remote control signal is transmitted from the remote controller 60, and the microcomputer 50 detects the signal and executes the channel preset processing. In this channel preset processing, initial channels are first set on the basis of a channel plan according to a broadcasting form such as normal television broadcasting, CATV-NORMAL, or CATV-HRC (step S110), and on-air judgement processing for determining whether or not a station is present on the channel (step S120)

In this on-air judgement processing, the microcomputer sends to the tuner 10 the frequency data with respect to the center frequency f0 of the aforementioned set channel (step S205). Then, the tuner 10 tunes to the corresponding frequency on the basis of that frequency data and outputs an intermediate frequency signal to the VIF circuit 20, which in turn subjects the intermediate frequency signal to intermediate-frequency amplification and then outputs the same to the video IC 30. The video IC 30 effects video detection with respect to the amplified video intermediate frequency signal, subjects its detection output to various signal processing to output a video signal, and separates the horizontal and vertical synchronizing signals from the detection output and outputs the same. Further, the video IC 30 generates an AFC voltage corresponding to the offset of the frequency of the actual image carrier wave from the reference frequency, and supplies the horizontal and vertical synchronizing signals and the AFC voltage to the microcomputer 50.

The microcomputer 50 determines the presence or absence of the horizontal synchronizing signal from the video IC 30, and if it cannot be determined that the horizontal synchronizing signal is present, the received frequency of the tuner 10 is varied in the range between (f0−2.06) MHz and (f0+1.31) MHz until it can be determined that the horizontal synchronizing signal is present (steps S210 to S250). Of course, in a case where the television broadcasting signal is absent, the horizontal synchronizing signal is absent even if the received frequency is varied. Accordingly, as a result of varying the received frequency of the tuner 10, if it cannot be determined that the horizontal synchronizing signal is present, the fact of the channel being a skipped channel is stored in the corresponding channel position of the EEPROM 70 (step S255).

On the other hand, if it is determined that the horizontal synchronizing signal is present, predetermined AFC inflection point detection processing is executed by using the received frequency of the tuner 10 as a starting point (steps S260, S265, S270, S275, and S280). Namely, if the received frequency of the tuner 10 is offset from the normal tuning point on the basis of the AFC voltage supplied from the video IC 30, the frequency is varried in very small steps in correspondence with the direction of the actual offset, and the AFC inflection point at which the direction of the offset changes is detected. Of course, to detect the AFC inflection point is none other than to detect the normal tuning point, and even in a case where it is determined that the horizontal synchronizing signal is present, if the AFC inflection point cannot be detected, it is determined that the television broadcasting signal is absent. In addition, even if the horizontal synchronizing signal is detected in the frequency band ranging between (f0−2.06) MHz and (f0+1.31) MHz, if the AFC inflection point cannot be detected, the fact of the channel being a skipped channel is stored in the corresponding channel position (step S255).

On the other hand, if the AFC inflection point can be detected, the presence or absence of the horizontal synchronizing signal from the video IC 30 is detected at the received frequency at which the AFT inflection point was detected (step S310). Here, if the presence of the horizontal synchronizing signal has been detected, the presence or absence of the vertical synchronizing signal from the video IC 30 is detected until the lapse of 100 ms in total (step S320). Then, if the presence of the vertical synchronizing signal has been detected, the presence or absence of the horizontal synchronizing signal is detected again after the lapse of 100 ms in total (step S330). Thus, if the presence of the synchronizing signals has been detected in all the detection processes, the fact of the channel being a memory channel is stored in the corresponding channel position (step S340). Meanwhile, if the absence of the synchronizing signal has been detected in any one of the detection processes, the fact of the channel being a skipped channel is stored in the corresponding channel position (step S350).

Thereafter, by similarly executing the on-air judgement processing while setting the channels consecutively on the basis of a predetermined channel plan, the fact of the channel being either a memory channel or a skipped channel is stored in the corresponding channel position, and upon completion of the processing of the last channel, the channel preset ends (step S120–S140).

As described above, the arrangement provided is such that, in effecting the channel preset, the microcomputer 50 first determines whether or not a broadcasting is on the air on the basis of the presence or absence of the horizontal synchronizing signal obtained through synchronizing separation by the video IC 30, and if it is thereby determined that the broadcasting is on the air, the broadcasting signal is pulled into the normal tuning point on the basis of the AFC voltage from the video IC 30, whereupon the corresponding channel is stored if the vertical synchronizing signal from the video IC 30 can be detected at the normal tuning point Therefore, it is possible to provide a channel preset device which is capable to detecting an on-air channel more reliably and storing the same without adding special circuitry and the like.

What is claimed is:

1. A channel preset device comprising:

tuner means for receiving a television broadcasting signal corresponding to a desired frequency and subjecting the television broadcasting signal to predetermined signal processing and outputting the same:

sync separation means for separating horizontal and vertical synchronizing signals from the output signal of the tuner means and outputting the same;

on-air judgment means for provisionally judging whether a broadcasting is on the air on the basis of the presence or absence of the horizontal synchronizing signal in the output signal of the sync separation means while continuously varying a received frequency of the tuner means;

tuning-point detection means for detecting a normal tuning point while varying the received frequency of the tuner means at neighboring frequencies of the frequency at which the horizontal synchronizing signal is detected, so that whether the broadcasting is on the air is judged; and channel memory means for storing a channel corresponding to the normal tuning point when it is detected that the vertical synchronizing signal is outputted from the sync separation means at the normal tuning point detected by the tuning-point detection means.

2. The channel preset device as set forth in claim 1, wherein the tuner means includes a frequency synthesizer system for directly controlling a local oscillation frequency of the tuning means in order to tune the system to the desired frequency in accordance with a predetermined channel plan.

3. The channel preset device as set forth in claim 1, wherein the output signal of the tuner means includes information concerning a difference voltage in accordance with an offset between the received frequency and an image carrier wave frequency, and wherein the tuning-point detection means detects the normal tuning point based on the difference voltage.

4. The channel preset device as set forth in claim 1, wherein the channel memory means confirms that the horizontal synchronizing signal is detected at the normal tuning point, before and after the detection of the vertical synchronizing signal.

5. The channel preset device as set forth in claim 3, wherein the tuning-point detection means detects the normal tuning point while varying the received frequency roughly at first, and subsequently varying finely.

6. A channel preset method comprising the steps of:

receiving a television broadcasting signal corresponding to a desired received frequency;

separating horizontal and vertical synchronizing signals from the received broadcasting signal;

judging provisionally whether a broadcasting is on the air on the basis of the presence or absence of the horizontal synchronizing signal in the broadcasting signal while continuously varying the received frequency;

detecting a normal tuning point while varying the received frequency at neighboring frequencies of the frequency at which the horizontal synchronizing signal is detected, so that whether the broadcasting is on the air is judged;

detecting the vertical synchronizing signal at the normal tuning point; and storing a channel corresponding to the normal tuning point when the vertical synchronizing signal is detected in the broadcasting signal at the normal tuning point detected by the tuning-point detection means.

7. The channel preset method as set forth in claim 6, wherein the normal tuning point is detected based on information concerning an offset between the received frequency and an image carrier wave frequency.

8. The channel preset method as set forth in claim 6, further comprising the steps of:

detecting the horizontal synchronizing signal at the normal tuning point, before and after the step of detecting the vertical synchronizing signal to store the channel.

9. The channel preset method as set forth in claim 7, wherein the normal tuning point is detected while varying the received frequency roughly at first, and subsequently varying finely.

* * * * *